(No Model.)　　　　　　　　　　　　　　　　　2 Sheets—Sheet 1.
J. A. BOWDEN.
FILTERING APPARATUS.
No. 528,652.　　　　　　　　　　　Patented Nov. 6, 1894.
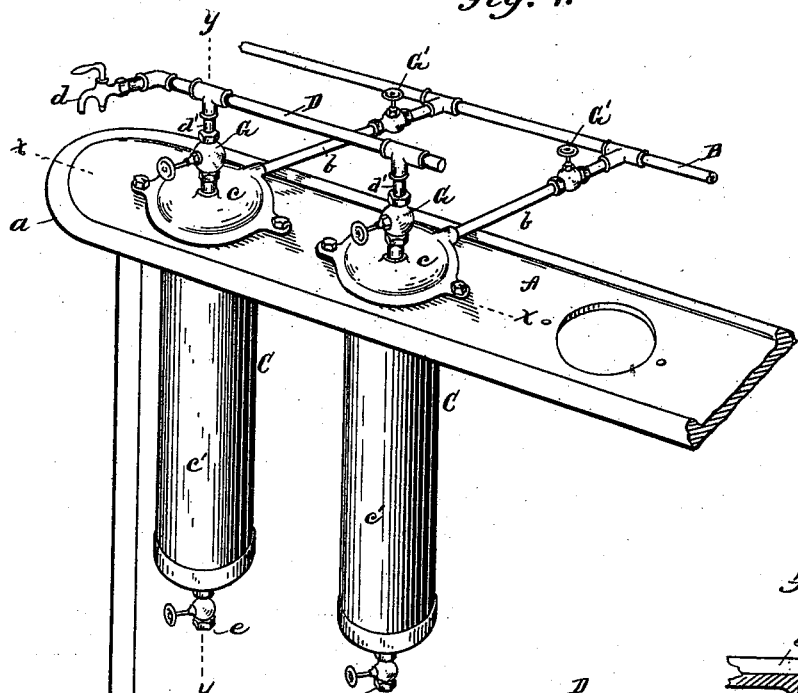
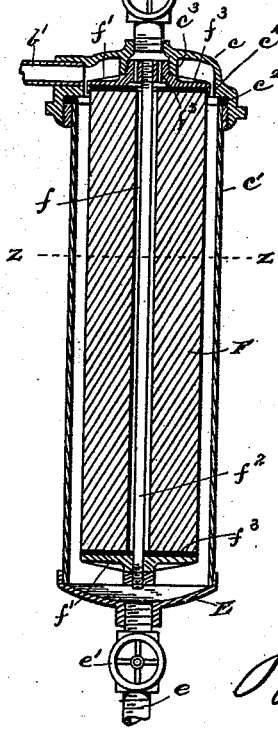
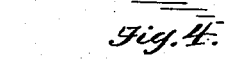
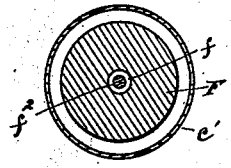
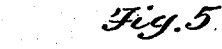
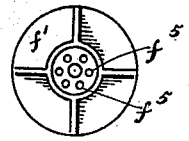
WITNESSES　　　　　　　　　　　　　　　INVENTOR (No Model.)  J. A. BOWDEN.  2 Sheets—Sheet 2.
FILTERING APPARATUS.
No. 528,652. Patented Nov. 6, 1894.
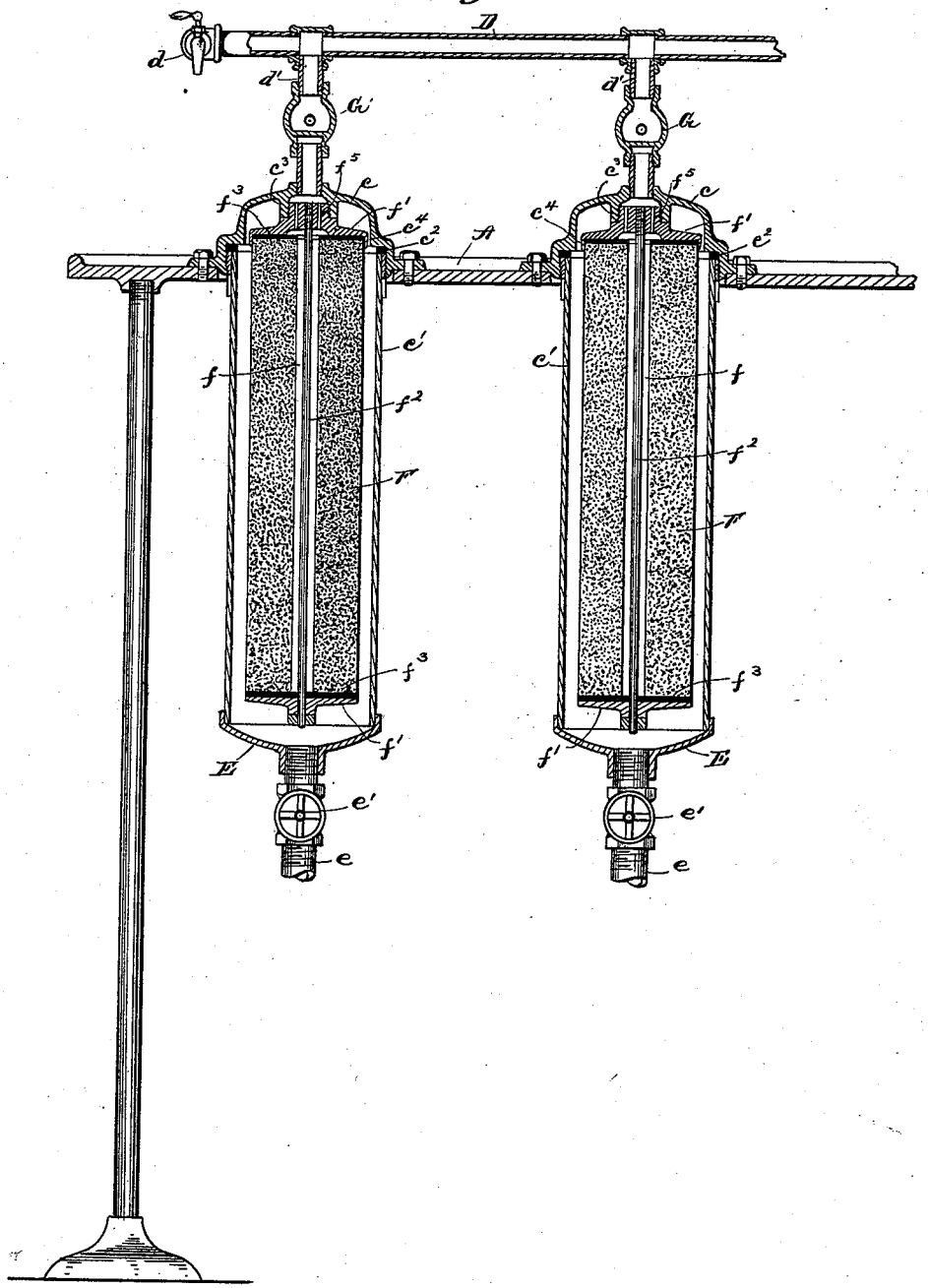
WITNESSES
D. W. Bradford
F. Clough
INVENTOR
Junius A. Bowden
by Parker & Barton
Attorneys.

UNITED STATES PATENT OFFICE.

JUNIUS A. BOWDEN, OF DETROIT, MICHIGAN.

FILTERING APPARATUS.

SPECIFICATION forming part of Letters Patent No. 528,652, dated November 6, 1894.

Application filed May 4, 1893. Serial No. 472,955. (No model.)

*To all whom it may concern:*

Be it known that I, JUNIUS A. BOWDEN, a citizen of the United States, residing at Detroit, county of Wayne, State of Michigan, have invented a certain new and useful Improvement in Filtering Apparatus; and I declare the following to be a full, clear, and exact description of the invention, such as will enable others skilled in the art to which it pertains to make and use the same, reference being had to the accompanying drawings, which form a part of this specification.

My invention relates to improvements in filtering apparatus, and consists in the improvements in the construction, arrangement and combinations hereinafter specified and more particularly pointed out in the claims.

In the drawings, Figure 1 is a perspective view of two of my improved filters, arranged in relation to each other and to service pipes, both of supply and discharge. Fig. 2 is a perpendicular section through the line $x$—$x$ of Fig. 1. Fig. 3 is a perpendicular section of one of the filters on line $y$—$y$ of Fig. 1. Fig. 4 is a transverse section on line $z$—$z$ of Fig. 3. Fig. 5 is a plan view of the inclosing cap or cover in the upper portion of the filter, showing the waterways for the filtered water. Fig. 6 is a sectional view of one of the supports or standards to the table or support carrying the filters.

Similar letters refer to similar parts.

In the drawings, A represents a support in which the filters properly are located and held. This support is carried upon pedestals or standards at either end $a$, only one of which, however, is shown.

B is a service pipe communicating with a water service, as, the water-works of a city, or any other source of supply.

C C are filters.

$b$ $b$ are connecting pipes, connecting the top of the filter with the service pipe.

D is a communicating pipe between filters, and $d$ is the discharge for all of them.

It is my intention that not less than two of the filters shall be used in connection, for reasons which will hereinafter appear; but it will be obvious that any number of them could be situated in the same relation to each other as the two shown.

$c$ $c$ are the heads of the two filters respectively, and which are bolted by appropriate bolts to the support.

$c'$ $c'$ are the filter barrels, which, as illustrated in Figs. 2 and 3, are inserted by appropriate screw threads into the heads $c$ $c$. As these barrels are usually constructed of thin metal, they are reinforced at the upper end by a ring, upon which the screw thread is formed. Between the heads and the barrel, reinforced by the ring, is interposed a rubber gasket or packing $c^2$. When the barrel is screwed in position, the connection is thus rendered water tight. At the lower end, a head E is also screwed upon a barrel, and is thus capable of removal. This carries a discharge pipe $e$, the opening of which is controlled by a stopcock $e'$. The upper head $c$ has the connecting pipes $b$ $b$ entering, as shown in section in Fig. 3, at $b'$.

The filtering material preferably consists of a peculiar porous stone cut in the form of a cylinder. This is shown in Figs. 2, 3 and 4, at F. The stone is perforated at the axis of the cylinder, as shown at $f$, and is inclosed between two caps, one at each end, $f'$, $f'$, which are drawn together longitudinally by a tie rod $f^2$. Between the caps and the ends of the stone are interposed rubber gaskets $f^3$ $f^3$, making the ends water tight. The tie rod $f^2$ is somewhat smaller than the perforation in the stone F, leaving a space surrounding it between the stone and the rod, as shown in Fig. 4. The heads $c$ $c$ are perforated in the center, the upper portion of the perforation receiving a discharge pipe $d'$, which communicates with the main discharge D. The lower portion of this opening is somewhat enlarged, and, by means of an annular lip extending around it at $c^3$, the upper cap $f'$ of the stone, by means of a threaded projection, is screwed firmly to the head $c$. This connection is also made water tight. In the upper cap $f'$, and surrounding the perforation in which the tie rod $f^2$ is inserted, is formed a series of perforations $f^5$ $f^5$. These perforations communicate with a central perforation or hole in the stone F, and permit communication from the central perforation in the stone to the discharge pipe. Interposed in the discharge pipe are appropriate valves G. Interposed in the service pipe are also valves G'. The cap $f'$ is not quite as large in external diameter as the interior diameter of the head c, thus leaving a narrow annular slit or opening, as shown in Fig. 3, especially, at $c^4 c^4$, which opening may be proportioned to any desired size in the construction of the device. Each of the filters is exactly the same in construction, and therefore the description of one serves as a description for all.

The mode of operation in the process of filtering is as follows: Water on being admitted from the service pipe passes into the annular space above the filter formed by the junction of the head c and the cap f' to the stone F, and from thence passes through the narrow slits $c^4 c^4$ hereinbefore referred to, into the body or case of the filter C, and filling the space between it and the stone F. The stone being porous, the water is forced through it or passes through it, and emerges by the internal perforation, passing up through perforations $f^5 f^5$ in the cap f'; and from thence through to the discharge pipe D, the passage of the water through the stone filtering it from all impurities. It is drawn off as desired from the common discharge pipe d by means of the valve attached thereto. Each of the filters so described, being identical in construction, as hereinbefore stated, communicate, as shown in the drawings, with the general discharge pipe D, and, aside from such communication, operate in filtering the water entirely independent of each other. It is obvious that, by closing the valve in the pipe leading from the discharge pipe D to any one of the filters in the series, that particular filter would be closed off from the discharge, and, although it would be in communication with the service pipe, no water would pass through it. It is also obvious that, closing the valve in the pipe communicating with the service pipe in addition to the valve leading to the discharge pipe, the particular filter would be cut out entirely from the series, and its parts easily removed and inspected or replaced as might be desired. As, however, all filters necessarily require that the filtering material shall be thoroughly cleansed, the form of construction which I have adopted and hereinbefore described affords novel and peculiar facilities, not only for cleansing by manual operation such as washing the surface of the stone, but a novel mode of cleansing by counter currents as well. The mode of operation in such washing by a counter current is as follows: Assuming that there are two in the series, and for this purpose it is always necessary to have two in the apparatus, if the valve in the pipe between the filter selected for cleansing and the discharge pipe be left open and the valve at the end of the discharge pipe D be closed, while that in the pipe communicating with the service pipe is left open, as hereinbefore stated there would be no circulation through such filter, for the reason that the pressures in the chamber inside of the stone and on the outer side of the stone would be equal. If now, in the filter selected for cleaning, the stopcock e' attached to the discharge pipe e be opened, it is obvious that the liquid contained in the annular chamber surrounding the stone would be relieved from pressure at the lowest point in the chamber, and would be discharged through the discharge pipe e. This, in consequence of the construction and location of the annular slit at $c^4$, would produce a flow of water from the chamber above, through the slit and over the surface of the stone, and out through the discharge pipe e. This flow would be proportioned in power to the pressure of water, the size of the openings at $c^4$, and the size of the discharge opening at e, the latter being controllable by the stopcock e'. It follows, therefore, that the surface of the stone can be washed off by this mode of operation, as a consequence of the described construction; but, while this operation of washing off the surface of the stone is going on, there is also a continued pressure of filtered water in the chamber within the stone undergoing washing, derived from the adjacent filter through the common discharge pipe D, and as the opening of the stopcock e' is followed by a reduction of pressure upon the surface of the inclosed filtering stone, the pressure of filtered water in the interior of the stone thus becomes greater than that upon the surface of the stone, and, consequently, filtered water is forced in a reverse direction radially outward from the center of the stone throughout its whole longitudinal extent to the surface of the stone, carrying out through and also loosening impurities upon the outer surface, and mingling with the unfiltered washing water, passing through the annular slit, the two in common passing off out through the discharge pipe e.

By means of proportioning the various pressures and power to discharge by operating the valves, this operation can be varied to any desired extent, and can be kept up until the stone is thoroughly cleansed by means of the filtered water. This power to cleanse by the combined means of filtered water and surface washing is very important, as, in cleansing a stone by circulation with unfiltered water alone, the interior of the stone is left at the end of the so called cleansing operation in an impure state, due to the presence of the unfiltered water and the impurities which it carries; and I have obtained this result in this apparatus in a very simple, expeditious and complete manner. In practice the larger part of the material strained out by means of the filtering stone from the water that is being filtered is left upon its surface. Hence, if the washing process upon its outer surface, as hereinbefore described, is not complete and does not thoroughly cleanse it, it can be easily washed, scraped or brushed, or cleaned in any manner convenient by simply removing, by unscrewing from its socket the thin metal barrel which surrounds the stone, leaving its outer surface entirely exposed, but without disturbing it or disturbing any of its relations to the other filter. While in this condition, by opening the service pipe valve, the water is allowed to flow through the annular slit $c^4$, and to flow over the surface of the stone as hereinbefore described in a thin but continuous sheet. By opening the valve in the pipe communicating with pipe D, and allowing the filtered water from the adjacent filter to pass into the filter under inspection and in process of cleaning, the filtered water may be observed passing from the longitudinal center of the stone to its outer surface, where, mingling with the sheet of water hereinbefore described, they both run off from the lower end.

By unscrewing the lower cap which is threaded upon the central rod extending to the upper cap, the stone is easily removed, and, if desired, another one can be put in its place, when, by simply packing and screwing on the lower cap to the rod, it is held firmly in position.

From the foregoing description of the mode of operation in the various operations required in this filter, it is obvious that any number of filters may be employed in a so called battery, and that therefore any amount of filtering surface can be obtained by the simple process of duplication, as, if, for instance, one of the filters carrying one stone is capable of filtering fifteen gallons per hour, in order to obtain a filter plant capable of filtering any amount of water per hour, all that is necessary to do is to correspondingly multiply the number of filtering stones and corresponding apparatus, connecting them all to a discharge pipe D, as hereinbefore stated. It is also obvious that each of them may be cleaned entirely independent of the other, and that they may be cleaned in rotation, and without destroying for the time being the power of obtaining filtered water from the other filters.

What I claim is—

1. In a filter, the combination of a casing, divided into an upper chamber into which is received the water to be filtered, and two lower chambers divided by a vertical filtering wall, into one of which lower chambers is received unfiltered water from the upper chamber, and into the other of which is collected the filtered water, suitable inlet and outlet pipes, the passage-way between the upper chamber and the lower chamber for unfiltered water being a narrow slit arranged immediately adjacent to the upper end of the filtering wall and adapted to discharge a thin sheet of water from above downward across the surface thereof, substantially as and for the purpose described.

2. In a filter, the combination, in a suitable casing, of a reception chamber at the top part thereof, a dependent hollow filtering medium, an outer chamber surrounding the same, an outlet at the bottom of said outer chamber, a passage from the reception chamber to the outer chamber made in the form of a narrow slit and arranged adjacent to the top of the filtering medium, and adapted to discharge a thin sheet of water from above downward across the surface thereof, substantially as described.

3. In a filter, the combination of an inlet pipe, a support, a cap removably attached to said support, a central opening in said cap communicating with the discharge pipe, a secondary cap removably attached to the first named cap, a water way in the secondary cap with means for connecting to the central opening in first cap, the secondary cap uniting with a plate, a hollow filter tube and means for binding the same between the plate and secondary cap, an imperforated external casing removably attached to the first named cap, said casing at its lower end having a waste outlet, substantially as described.

4. In a filter, the combination of a perforated bench, a cap removably attached thereto, with a depending flange having an internal thread and a central opening in said cap, means whereby such central opening communicates with the discharge pipe, an annular flange surrounding said central opening and depending therefrom and carrying an internal thread, a secondary cap engaging in such internal thread and carrying removably dependent from its center a rod and having perforations extending from its upper to its lower surface within the engaging flange, an imperforate external barrel attached by the screw threads to the first named cap, said barrel being closed at the bottom and having therein a controllable outlet, a filtering stone inclosed centrally in said barrel and held between the second named cap, and an annular packed flange at its opposite end removably attached to the dependent rod, said filtering stone being perforated axially by a perforation larger than the dependent rod, and through which said rod passes, substantially as and for the purpose described.

5. In a filter, the combination of an inlet pipe, a support, a cap removably attached to said support, a central opening in said cap communicating with the discharge pipe, a secondary cap removably attached to the first named cap, a water way in the secondary cap with means for connecting to the central opening in the first cap, the secondary cap uniting with a plate by means of a tie rod and a hollow filtering tube supported between said plate and the secondary cap, an imperforate external casing removably attached to the first named cap, said casing at its lower end having a waste outlet, substantially as described.

In testimony whereof I sign this specification in the presence of two witnesses.

JUNIUS A. BOWDEN.

Witnesses:
R. A. PARKER,
MARION A. REEVE.